United States Patent
Zhao

(10) Patent No.: US 12,484,059 B2
(45) Date of Patent: Nov. 25, 2025

(54) RESOURCE RESERVATION METHOD, APPARATUS AND TERMINAL

(71) Applicant: Beijing Xiaomi Mobile Software Co., Ltd., Beijing (CN)

(72) Inventor: Qun Zhao, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 413 days.

(21) Appl. No.: 17/904,090

(22) PCT Filed: Feb. 14, 2020

(86) PCT No.: PCT/CN2020/075297
§ 371 (c)(1),
(2) Date: Aug. 11, 2022

(87) PCT Pub. No.: WO2021/159474
PCT Pub. Date: Aug. 19, 2021

(65) Prior Publication Data
US 2023/0075899 A1   Mar. 9, 2023

(51) Int. Cl.
*H04W 72/20*   (2023.01)
*H04W 72/02*   (2009.01)
*H04W 72/044*  (2023.01)
*H04W 4/40*    (2018.01)

(52) U.S. Cl.
CPC .......... *H04W 72/20* (2023.01); *H04W 72/02* (2013.01); *H04W 72/044* (2013.01); *H04W 4/40* (2018.02)

(58) Field of Classification Search
CPC ... H04W 72/20; H04W 72/02; H04W 72/044; H04W 4/40; H04W 72/25; H04W 28/26
See application file for complete search history.

(56) References Cited

U.S. PATENT DOCUMENTS

| | | | |
|---|---|---|---|
| 2018/0027418 A1 | 1/2018 | Li et al. | |
| 2021/0153231 A1* | 5/2021 | Yeo | H04W 4/70 |
| 2021/0250136 A1* | 8/2021 | Ye | H04W 72/20 |

(Continued)

FOREIGN PATENT DOCUMENTS

| CN | 108632779 A | 10/2018 |
|---|---|---|
| CN | 109496440 A | 3/2019 |

(Continued)

OTHER PUBLICATIONS

"Radio resource selection behaviour for sensing and semi-persistent transmissions," Proceedings of the 3GPPP TSG RAN WG2 Meeting #95, Panasonic, R2-164849, Aug. 22, 2016, Gothenburg, Sweden, 3 pages.

(Continued)

*Primary Examiner* — Peter P Chau
(74) *Attorney, Agent, or Firm* — McCoy Russell LLP

(57) ABSTRACT

A resource reservation method, which belong to the field of communications technologies. Said method includes: acquiring a reservation resource limit, the reservation resource limit being used to limit a quantity of time-frequency resources reserved by a terminal; determining, on the basis of the reservation resource limit, time-frequency resources needing to be reserved for current transmission; and sending sidelink control information, the sidelink control information includes information of the time-frequency resources needing to be reserved.

18 Claims, 7 Drawing Sheets

(56) References Cited

U.S. PATENT DOCUMENTS

2021/0250772 A1\* 8/2021 Farag .................... H04W 16/02
2022/0353747 A1\* 11/2022 Peng ....................... H04L 1/189

FOREIGN PATENT DOCUMENTS

| CN | 109644436 A | 4/2019 |
|---|---|---|
| CN | 109873689 A | 6/2019 |
| CN | 110677883 A | 1/2020 |
| WO | 2020033381 A1 | 2/2020 |

OTHER PUBLICATIONS

"3GPP TR 21.915 V0.0.1," 3rd Generation Partnership Project; Technical Specification Group Services and System Aspects; Release 15 Description; Summary of Rel-15 Work Items, Release 15, Mar. 2018, 28 pages.

"3GPP TR 21.914 V14.0.0," 3rd Generation Partnership Project; Technical Specification Group Services and System Aspects; Release 14 Description; Summary of Rel-14 Work Items, Release 14, May 2018, 103 pages.

"Sidelink Resource Allocation Mode-2 Design for NR V2X Communication," Proceedings of the 3GPP TSG RAN WG1 Meeting #97, Intel Corporation, R1-1906796, May 13, 2019, Reno, Nevada, 18 pages.

"Resource Allocation Mode-2 for NR V2X Sidelink Communication," Proceedings of the 3GPP TSG RAN WG1 Meeting #98bis, Intel Corporation, R1-1910650, Oct. 14, 2019, Chongqing, China, 28 pages.

"Resource Allocation for Mode 2," Proceedings of the 3GPP TSG RAN WG1 #99, Apple, R1-1912812, Nov. 18, 2019, Reno, Nevada, 9 pages.

"Discussion on SL Mode 2 left Issues," Proceedings of the 3GPP TSG-RAN WG2 #109-e, Ericsson, R2-2000882 (Revision of R2-1915378), Feb. 24, 2020, Electronic Meeting, 6 pages.

\* cited by examiner

RESOURCE RESERVATION METHOD, APPARATUS AND TERMINAL

CROSS REFERENCE TO RELATED APPLICATION

The present application is a U.S. National Phase of International Application No. PCT/CN2020/075297 entitled "RESOURCE RESERVATION METHOD, APPARATUS AND TERMINAL," and filed on Feb. 14, 2020. The entire contents of the above-listed application are hereby incorporated by reference for all purposes.

BACKGROUND

Vehicle to everything (V2x) communication includes Vehicle to Vehicle (V2V) communication, Vehicle to Infrastructure (V2I) communication, and Vehicle to Pedestrian (V2P) communication. Supporting the Vehicle to everything communication by using a cellular communication technology can effectively utilize an existing base station deployment, reduce device overhead, be further conducive to providing services guaranteeing Quality of Service (QoS) and meet demands of Vehicle to everything services. Thus, a cellular network is provided in Long Term Evolution (LTE) so as to support the V2x communication, namely, Cellular based V2x (C-V2x).

SUMMARY

According to an aspect of examples of the disclosure, a resource reservation method is provided and includes:
  obtaining a reservation resource limit, in which the reservation resource limit is configured to limit a quantity of time-frequency resources reserved by a terminal;
  determining, based on the reservation resource limit, time-frequency resources needing to be reserved for current transmission; and
  sending sidelink control information, in which the sidelink control information includes information of the time-frequency resources needing to be reserved.

According to another aspect of examples of the disclosure, a terminal is provided and includes: a processor; and a memory configured to store an instruction executable by the processor, in which the processor is configured to load and execute the executable instruction so as to implement the above resource reservation method.

According to another aspect of examples of the disclosure, a computer-readable storage medium is provided, in which when an instruction in the computer-readable storage medium is executed by a processor, the above resource reservation method can be executed.

It should be understood that the above general description and the following detailed description are merely examples and are merely explanatory instead of limiting the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the disclosure.

DETAILED DESCRIPTION

Examples will be described in detail here, whose instances are represented in the accompanying drawings. When the following description involves the accompanying drawings, unless otherwise indicated, the same numbers in different accompanying drawings represent the same or similar elements. Implementations described in the following examples do not represent all implementations consistent with the disclosure. Rather, they are merely examples of an apparatus and method consistent with some aspects of the disclosure as detailed in appended claims.

The disclosure relates to the technical field of communication, in particular to a resource reservation method, an apparatus and a terminal.

In C-V2x, communication between vehicle-mounted devices and other devices can be transferred through a base station and a core network, that is, communication is performed by using a communication link between a terminal device and a base station in an original cellular network, or communication can be performed directly through a Sidelink between devices (Sidelink communication). The Sidelink communication has characteristics of being short in time delay, low in overhead and the like and is quite suitable for direct communication between vehicle-mounted devices and other surrounding devices with geographic locations close to geographic locations of the vehicle-mounted devices. Supporting a new V2x communication service and scenario by using a 5G New Radio (NR) technology has been planned as a significant content of R16 by 3GPP.

In 5G V2x Sidelink communication, in order to reduce mutual interference between users caused by selecting the same time-frequency resource, a device is supported to reserve a time-frequency resource for future data transmission which has not occurred. In order to reduce signaling overhead, a volume of a reserved frequency resource is the same as a volume of a frequency resource used by current data transmission. Sidelink Control Information (SCI) associated with data transmission every time can indicate locations of a plurality of time-frequency resources including transmission this time for repeated transmissions of the same data block, and the repeated transmissions may be feedback-based retransmission or blind retransmission.

Figure 1:
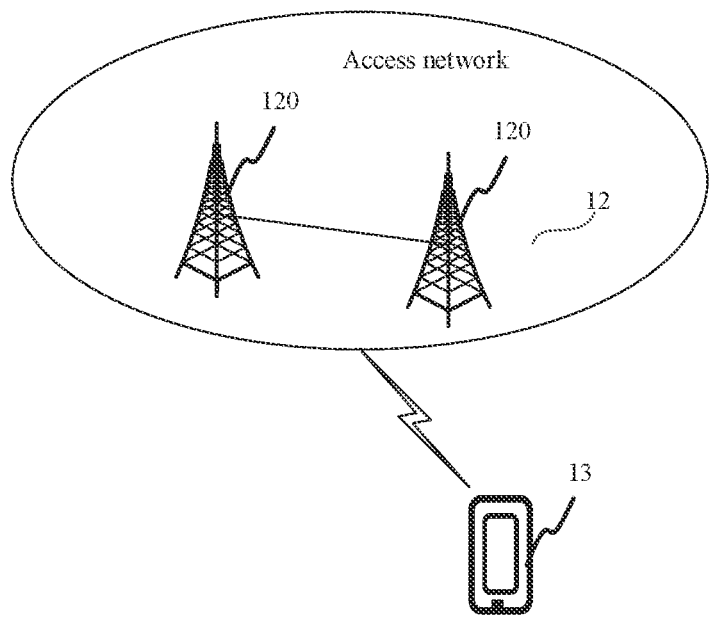
FIG. 1 is a schematic diagram of a communication system provided by an example of the disclosure.

FIG. 1 illustrates a schematic diagram of a communication system provided by an example of the disclosure. As shown in FIG. 1, the communication system may include: an access network 12 and a terminal 13.

The access network 12 includes a plurality of access network devices 120. The access network devices 120 may be base stations. The base stations are apparatuses deployed in the access network and configured to provide a wireless communication function for the terminal. The base stations may include various types of a macro base station, a micro base station, a relay station, an access point and the like. In a system using different wireless access technologies, names of devices with a base station function may differ, for example, in an LTE system, called eNodeB or eNB; and in a 5G New Radio (NR) system, called gNodeB or gNB. With evolution of a communication technology, the name "base station" may change. For convenient description, the above apparatus for providing the wireless communication function for the terminal is generally called the access network device below.

The terminal 13 may include various terminals with a wireless communication function, for example, vehicle-mounted devices, for another example, hand-held devices, wearable devices, computing devices or other processing devices connected to a wireless modem, and various types of user equipment (UE), mobile stations (MSs), terminal devices and the like. For convenient description, the devices mentioned above are generally called terminals. The access network device 120 communicate with the terminal 13 through a certain radio technology, for example, a Uu interface.

A Sidelink technology of a 5G NR system may be applied to V2X communication. In 5G V2x Sidelink communication, SCI associated with data transmission every time may indicate locations of a plurality of time-frequency resources including transmission this time for repeated transmissions of the same data block. For example, when the total quantity Nmax including time-frequency resources used this time and aperiodic or current-period time-frequency resources capable of being reserved in SCI is 3, locations of 1, 2 or 3 time-frequency resources may be assigned in SCI carried by data transmission once of the terminal, that is, locations of 0, 1 or 2 time-frequency resources used for future transmission may be reserved. In view of signaling overhead, a time difference between locations of reserved time-frequency resources and locations of time-frequency resources used for the current transmission is limited to not exceed W slots.

Figure 2:
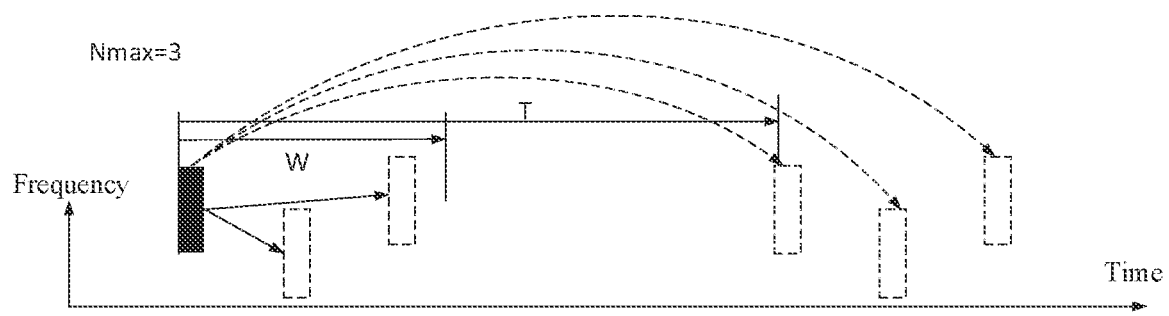
FIG. 2 is a schematic diagram of resource reservation provided by an example of the disclosure.

Besides, when a system is in supporting (namely, a relevant configuration value is "enable"), period indication information may be contained in the SCI. When an indicated period is not 0, locations of N time-frequency resources same as indication of the SCI in the present period may be reserved in a next period. As shown in FIG. 2, Nmax=3, 2 time-frequency resources in W slots, and 3 time-frequency resources for transmitting new data in the future after a period T may be reserved in a current period in one current transmission.

In 5G V2x, the terminal auto-selects time-frequency resources for transmission of data and accompanying control information in a configured time-frequency resource pool. For example, the terminal monitors resource reservation information contained in corresponding SCI during sending of data of other terminals to predict a future resource utilization condition, and avoids using time-frequency resources with strong interference as much as possible during time-frequency resource selection for own data transmission. For example, the terminal associates each monitored time-frequency resource reserved and used by other users with an SL_RSRP measured value, and when the measured value is higher than a threshold, the terminal avoids using the time-frequency resource. The SL_RSRP measured value may be obtained by measuring a demodulation reference signal (DMRS) of a physical sidelink shared channel (PSSCH) used for data transmission or a DMRS of a physical sidelink control channel (PSCCH) used for control information transmission which is associated with the data transmission.

However, how to perform resource reservation operation in subsequent retransmission in the same period is not regulated in a current protocol. For example, whether or not a time-frequency resource already reserved needs to be reserved again in the subsequent retransmission, and whether or not a time-frequency resource of the same location in a next period needs to be reserved in transmission of every time. Carrying out resource reservation as much as possible and as early as possible is conducive to reducing a possibility of transmission collision of each terminal. However, from another aspect, if a user reserves time-frequency resources which exceed the need for successful transmission, a waste of system resources may be caused. Or a user device changes a selected time-frequency resource due to occupation of higher-priority data, for example, the time-frequency resource reserved by the terminal includes a current period and a next period, but a resource in the current period is preempted by higher priority of other terminals, so time-frequency resources in the current period and the next period need to be reselected. Other terminals which perform resource preemption may have no data needing to be transmitted in the next period, so resources already reserved in the next period corresponding to these preempted resources are wasted, the waste of the system resources is also caused.

The communication system and a service scenario described in the examples of the disclosure intend to describe technical solutions of the examples of the disclosure more clearly instead of constituting limitation on the technical solutions provided by the examples of the disclosure. Those ordinarily skilled in the art can realize that with evolution of the communication system and emerging of a new service scenario, the technical solutions provided by the examples of the disclosure are also suitable for similar technical problems.

Figure 3:
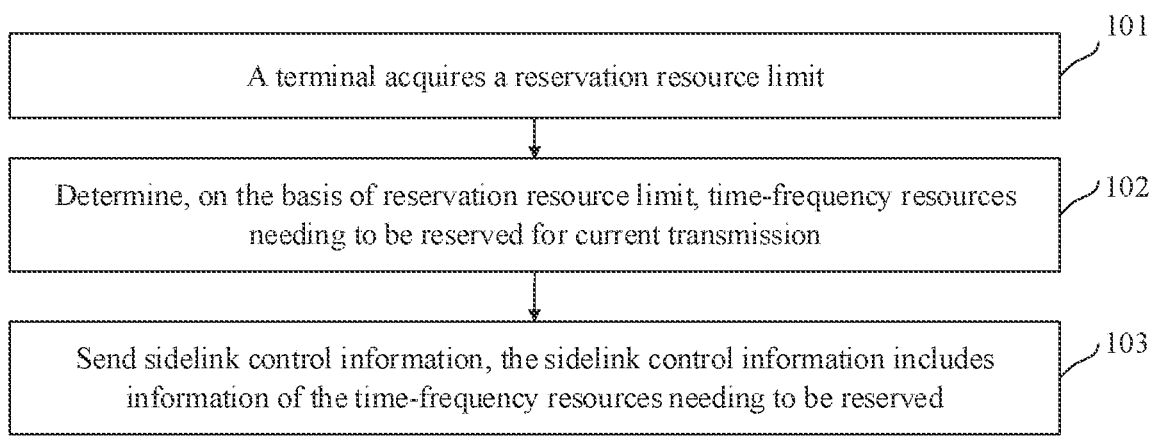
FIG. 3 is a flowchart of a resource reservation method illustrated according to an example.

FIG. 3 is a flowchart of a resource reservation method illustrated according to an example. Referring to FIG. 3, the method includes the following steps:

In step 101, a terminal obtains a reservation resource limit.

The reservation resource limit is configured to limit the quantity of time-frequency resources reserved by the terminal. For example, the quantity of first type time-frequency resources capable of being reserved is limited, or the total quantity of first type time-frequency resources capable of being reserved and second type time-frequency resources capable of being reserved is limited.

The first type time-frequency resources are aperiodic time-frequency resources or periodic time-frequency resources in the same period of the current transmission, and the second type time-frequency resources are periodic time-frequency resources in a next period of the current transmission.

In step 102, time-frequency resources needing to be reserved for current transmission are determined based on the reservation resource limit.

For example, firstly, the quantity of the time-frequency resources needing to be reserved for the current transmission is determined based on the reservation resource limit, and then based on the quantity, time-frequency resources for reservation are selected, according to a chronological order, in the already selected time-frequency resources.

In step 103, sidelink control information is sent. The sidelink control information includes information of the time-frequency resources needing to be reserved.

The terminal may notify other terminals of the reserved time-frequency resources through the sidelink control information, so that reservation of these time-frequency resources is realized.

In the examples of the disclosure, the quantity of the time-frequency resources reserved by the terminal is limited through the reservation resource limit, so that the terminal can determine, based on the reservation resource limit, the time-frequency resources needing to be reserved for the current transmission during transmission, thus a waste of the time-frequency resources caused by too many time-frequency resources reserved by the terminal can be avoided, and the utilization ratio of resources is increased.

Optionally, the time-frequency resources needing to be reserved for current transmission are determined based on the reservation resource limit includes:
  whether or not a using condition of the reservation resource limit is met is determined, in which the using condition of the reservation resource limit includes at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and
  the time-frequency resources needing to be reserved for the current transmission are determined based on the reservation resource limit in response to that the using condition of the reservation resource limit is met.

In the implementation, by limiting the using condition of the reservation resource limit, as for different resources, different terminals or data, different reservation resource solutions may be adopted, it can be guaranteed that high-priority data or terminals can obtain more resources, and reasonability of resource reservation is improved.

For example, the reservation resource limit includes at least one of an upper limit of the total quantity of first type time-frequency resources capable of being reserved, an upper limit of the total quantity of second type time-frequency resources capable of being reserved, or an upper limit of the total quantity of the first type time-frequency resources capable of being reserved and the second type time-frequency resources capable of being reserved; and reservation resource limits corresponding to different data priorities are different.

In the implementation, different upper limits of the total quantity of the first type time-frequency resources, different upper limits of the total quantity of the second type time-frequency resources or different upper limits of the total quantity of the first type time-frequency resources and the second type time-frequency resources may be set for different data priorities. In this way, a larger upper limit of the total quantity may be set for data of a higher priority, so that more resource may be reserved for transmission of data of a higher priority, and better data transmission performance is obtained.

Certainly, in the reservation resource limits corresponding to different data priorities, one of the upper limits of the total quantity may be different, or two of the above three upper limits of the total quantity may be different, or all the three upper limits of the total quantity may be different, which is not limited by the application.

When there are the reservation resource limits of different data priorities, during subsequent resource reservation, the corresponding reservation resource limit is selected based on the data priority, and then the to-be-reserved time-frequency resources are determined.

Optionally, the time-frequency resources needing to be reserved for current transmission are determined based on the reservation resource limit includes:
  first type time-frequency resources needing to be reserved for the current transmission are determined based on the reservation resource limit; or
  first type time-frequency resources needing to be reserved and second type time-frequency resources needing to be reserved for the current transmission are determined based on the reservation resource limit.

The first type time-frequency resources are aperiodic time-frequency resources or periodic time-frequency resources in the same period of the current transmission, and the second type time-frequency resources are periodic time-frequency resources in a next period of the current transmission.

In the implementation, not only a reserved resource in a current transmission period but also a reserved resource in a subsequent transmission period may be determined based on the reservation resource limit.

Optionally, the first type time-frequency resources needing to be reserved for current transmission are determined based on the reservation resource limit includes:
  whether or not the first type time-frequency resources already reserved before the current transmission and not used reach an upper limit of the total quantity of the first type time-frequency resources capable of being reserved is determined;
  at least one of the first type time-frequency resources already reserved and not used is determined as the time-frequency resource needing to be reserved, or the first type time-frequency resources needing to be reserved are determined as null in response to that the first type time-frequency resources already reserved and not used reach the upper limit of the total quantity of the first type time-frequency resources capable of being reserved; and
  at least one of the first type time-frequency resources or at least one of the first type time-frequency resources not reserved before is determined as the time-frequency resource needing to be reserved in response to that the first type time-frequency resources already reserved and not used do not reach the upper limit of the total quantity of the first type time-frequency resources capable of being reserved.

In the implementation, the upper limit of the total quantity of the first type time-frequency resources capable of being reserved is regulated through the reservation resource limit, so that a waste of resources caused by too many resources reserved by the terminal is avoided.

Optionally, whether or not the first type time-frequency resources already reserved before the current transmission and not used reach an upper limit of the total quantity of the first type time-frequency resources capable of being reserved is determined includes:

the upper limit of the total quantity of the first type time-frequency resources capable of being reserved is determined based on a pre-defined or pre-configured reservation resource limit; or the upper limit of the total quantity of the first type time-frequency resources capable of being reserved is determined based on a reservation resource limit carried in downlink control information sent by an access network device.

In the implementation, the reservation resource limit may be obtained in modes of pre-defining, pre-configuring or sending by the access network device, and the like, and the above upper limit of the total quantity of the first type time-frequency resources capable of being reserved may be determined based on the obtained reservation resource limit.

Optionally, at least one of the first type time-frequency resources already reserved and not used is determined as the time-frequency resource needing to be reserved includes:

the following parameter values are used as the quantity of the time-frequency resources needing to be reserved:

min (Nmax−1, M), where Nmax is the total quantity including the time-frequency resource used this time and the first type time-frequency resources capable of being reserved in sidelink control information, and M is the upper limit of the total quantity of the first type time-frequency resources not used and capable of being reserved;

at least one of the first type time-frequency resources not reserved before is determined as the time-frequency resource needing to be reserved includes:

the quantity of the first type time-frequency resources needing to be reserved and not reserved before is min (Nmax−1, M−K), and the quantity of the first type time-frequency resources needing to be reserved and already reserved and not used is 0, where K is the total quantity of the first type time-frequency resources already reserved at present and not used; or the quantity of the first type time-frequency resources needing to be reserved and not reserved before is min (Nmax−1, M−K, L), and the quantity of the first type time-frequency resources needing to be reserved and already reserved and not used is min (K, Nmax−1−min (Nmax−1, M−K, L)), where L is the total quantity of the first type time-frequency resources not yet reserved at present;

at least one of the first type time-frequency resources is determined as the time-frequency resource needing to be reserved includes:

the quantity of the first type time-frequency resources needing to be reserved and not used is min (Nmax−1, P), where P is the total quantity of the first type time-frequency resources already selected by a user but not yet used for transmission; or the quantity of the first type time-frequency resources needing to be reserved and not used is min (Nmax−1, L).

In the implementation, the quantity of time-frequency resources needing to be reserved by the terminal is determined in the above determining mode, so that a waste of resources caused by too many resources reserved by the terminal can be avoided.

Optionally, the first type time-frequency resources needing to be reserved for the current transmission are determined based on the reservation resource limit further includes:

resource reservation is performed on the first type time-frequency resources needing to be reserved after the current transmission according to a chronological order.

In the implementation, after the quantity of the time-frequency resources needing to be reserved is determined, resource reservation is performed according to the chronological order, a waste of skipped resources caused by skip resource reservation is avoided.

Optionally, the first type time-frequency resources needing to be reserved and the second type time-frequency resources needing to be reserved for the current transmission are determined based on the reservation resource limit includes:

the quantity of the first type time-frequency resources needing to be reserved for the current transmission and not reserved before is determined;

whether or not a sum of the quantity of the second type time-frequency resources already reserved before the current transmission and the quantity of the first type time-frequency resources needing to be reserved for the current transmission and not reserved before exceeds an upper limit of the total quantity of the second type time-frequency resources capable of being reserved is determined;

it is determined that the second type time-frequency resources are not reserved for the current transmission in response to that the sum exceeds the upper limit of the total quantity of the second type time-frequency resources capable of being reserved; and it is determined that the second type time-frequency resources are reserved for the current transmission in response to that the sum does not exceed the upper limit of the total quantity of the second type time-frequency resources capable of being reserved.

In the implementation, whether or not it reaches an upper limit of the total quantity of the second type time-frequency resources capable of being reserved may be determined based on the quantity of time-frequency resources already used for transmission and already reserved, so that the quantity of the time-frequency resources needing to be reserved by the terminal is limited, and the waste of resources caused by too many resources reserved by the terminal can be avoided.

Optionally, whether or not the sum of the quantity of the second type time-frequency resources already reserved before the current transmission and the quantity of the first type time-frequency resources needing to be reserved for the current transmission and not reserved before exceeds the upper limit of the total quantity of the second type time-frequency resources capable of being reserved is determined includes:

an upper limit of the total quantity of the second type time-frequency resources capable of being reserved is determined based on a pre-defined or pre-configured reservation resource limit; or an upper limit of the total quantity of the second type time-frequency resources capable of being reserved is determined based on a reservation resource limit carried in downlink control information sent by an access network device.

In the implementation, the reservation resource limit may be obtained in modes of pre-defining, pre-configuring or sending by the access network device, and the like, and the above upper limit of the total quantity of the second type time-frequency resources capable of being reserved may be determined based on the obtained reservation resource limit.

Optionally, whether or not the sum of the quantity of the second type time-frequency resources already reserved before the current transmission and the quantity of the first type time-frequency resources needing to be reserved for the current transmission and not reserved before exceeds the upper limit of the total quantity of the second type time-frequency resources capable of being reserved is determined includes:

a statistical value of the number of times of transmissions in each period of the terminal within a set time length before a period the current transmission is within is determined; and a rounded-off statistical value is used as the upper limit of the total quantity of the second type time-frequency resources capable of being reserved.

In the implementation, in the reservation resource limit, a numerical value of the upper limit of the total quantity of the second type time-frequency resources capable of being reserved may be directly defined, or a method for obtaining the upper limit of the total quantity of the second type time-frequency resources capable of being reserved may also be defined. Obtaining the upper limit of the total quantity of the second type time-frequency resources capable of being reserved by using the above method is more suitable for actual conditions of the terminal.

Optionally, the first type time-frequency resources needing to be reserved and the second type time-frequency resources needing to be reserved for the current transmission are determined based on the reservation resource limit includes:

the first type time-frequency resources needing to be reserved and the second type time-frequency resources needing to be reserved are determined separately based on an upper limit of the total quantity of the first type time-frequency resources capable of being reserved and the second type time-frequency resources capable of being reserved.

In the implementation, the first type time-frequency resources needing to be reserved and the second type time-frequency resources needing to be reserved may be determined separately based on the reservation resource limit, and by limiting the total quantity of the two types of reserved resources, the waste of the resources caused by too many resources reserved by the terminal is avoided.

Optionally, the first type time-frequency resources needing to be reserved and the second type time-frequency resources needing to be reserved are determined separately based on the upper limit of the total quantity of the first type time-frequency resources capable of being reserved and the second type time-frequency resources capable of being reserved includes:

the upper limit of the total quantity of the first type time-frequency resources capable of being reserved and the second type time-frequency resources capable of being reserved is determined based on a pre-defined or pre-configured reservation resource limit; or the upper limit of the total quantity of the first type time-frequency resources capable of being reserved and the second type time-frequency resources capable of being reserved is determined based on a reservation resource limit carried in downlink control information sent by an access network device.

In the implementation, the reservation resource limit may be obtained in modes of pre-defining, pre-configuring or sending by the access network device, and the like, and the above upper limit of the total quantity of the first type time-frequency resources capable of being reserved and the second type time-frequency resources capable of being reserved may be determined based on the obtained reservation resource limit.

It is worth noting that the above steps 101 to 103 may be combined with the above optional steps at will.

Figure 4:
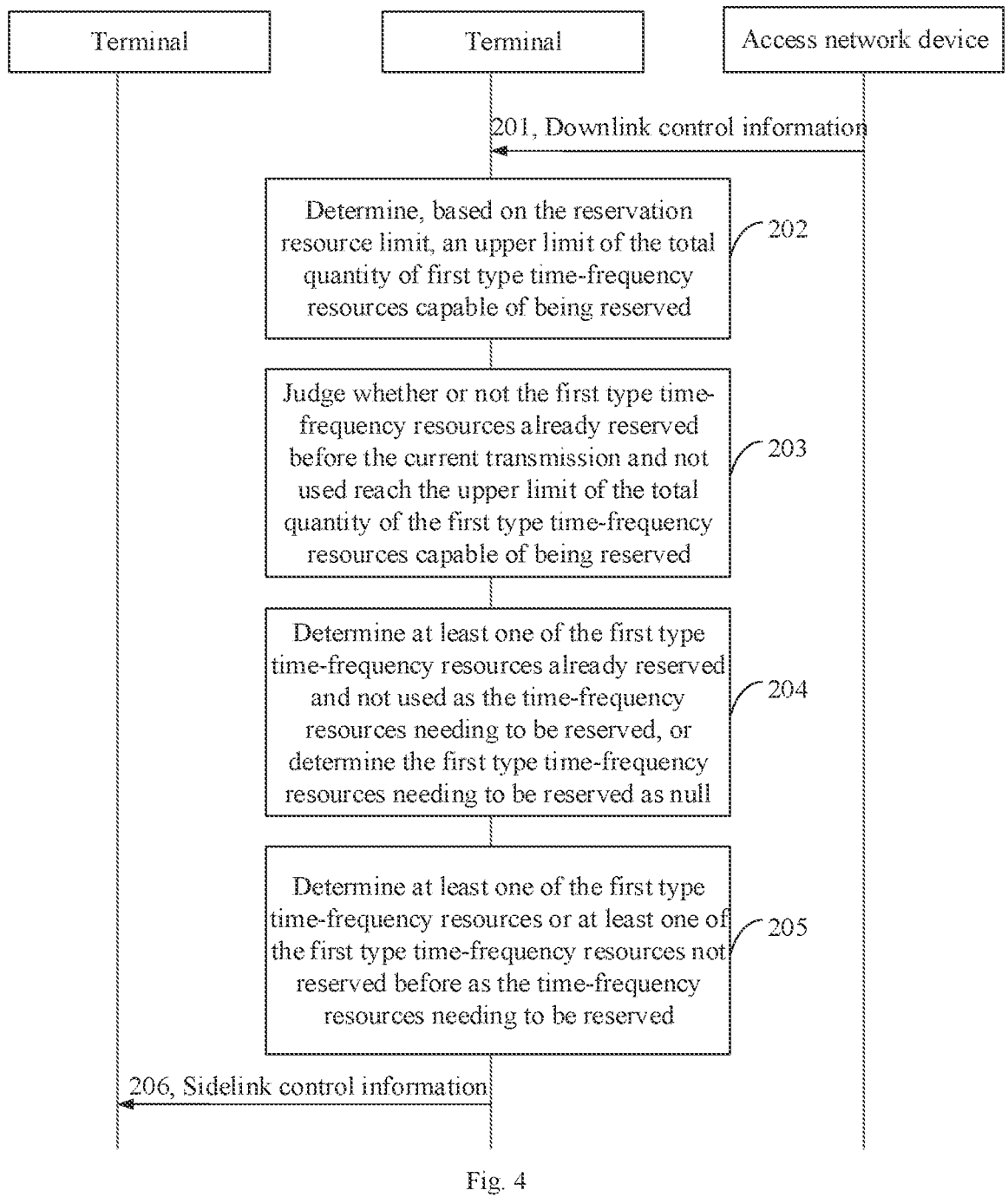
FIG. 4 is a flowchart of a resource reservation method illustrated according to an example.

FIG. 4 is a flowchart of a resource reservation method illustrated according to an example. Referring to FIG. 4, the method includes the following steps:

In step 201, an access network device sends downlink control information to a terminal, in which a reservation resource limit is carried in the downlink control information; and the terminal receives the downlink control information sent by the access network device.

Apart from sending the downlink control information carrying the reservation resource limit by the access network device to the terminal, the reservation resource limit may also be carried in other information, which is not limited by the application.

Besides, apart from sending the above reservation resource limit by the access network device, the reservation resource limit may also be written into the terminal by using modes of pre-defining or pre-configuring.

In step 202, the terminal determines the upper limit of the total quantity of the first type time-frequency resources capable of being reserved based on the reservation resource limit.

Here, the upper limit of the total quantity of the first type time-frequency resources capable of being reserved may be a fixed numerical value or equal to Nmax−1, where Nmax is the total quantity including the time-frequency resource used this time and the first type time-frequency resources capable of being reserved in sidelink control information.

The first type time-frequency resources are aperiodic time-frequency resources or periodic time-frequency resources in the same period of the current transmission.

The method provided by the example of the disclosure may be executed merely in certain scenarios, for example, the method may also include: whether or not a using condition of the reservation resource limit is met is determined, in which the using condition of the reservation resource limit includes at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and step 202 is executed in response to that the using condition of the reservation resource limit is met.

In step 203, the terminal judges whether or not the first type time-frequency resources already reserved before the current transmission and not used reach the upper limit of the total quantity of the first type time-frequency resources capable of being reserved. In response to that the first type time-frequency resources already reserved and not used reach the upper limit of the total quantity of the first type time-frequency resources capable of being reserved, step 204 is executed; and in response to that the first type time-frequency resources already reserved and not used do not reach the upper limit of the total quantity of the first type time-frequency resources capable of being reserved, step 205 is executed.

In step 204, the terminal determines at least one of the first type time-frequency resources already reserved and not used as the time-frequency resource needing to be reserved, or determines the first type time-frequency resources needing to be reserved as null.

In response to that the first type time-frequency resources already reserved and not used reach the upper limit of the total quantity of the first type time-frequency resources capable of being reserved, resource reservation is performed in a mode of step 204, a situation that a new time-frequency resource is reserved, and consequently the reserved first type time-frequency resources exceed the upper limit of the total quantity is avoided, For example, in step 204, the terminal may use the following parameter values as the quantity of the time-frequency resources needing to be reserved:

min (Nmax−1, M), where Nmax is the total quantity including the time-frequency resource used this time and the first type time-frequency resources capable of being reserved in sidelink control information, and M is the upper limit of the total quantity of the first type time-frequency resources not used and capable of being reserved.

In a solution of reserving the time-frequency resources already reserved, the above parameter values are selected for reservation of the time-frequency resources, which avoids exceeding the upper limit of the total quantity of the first type time-frequency resources capable of being reserved.

In step 205, the terminal determines at least one of the first type time-frequency resources or at least one of the first type time-frequency resources not reserved before as the time-frequency resource needing to be reserved.

In the implementation, there are two cases, one of which is that the terminal may reserve merely the time-frequency resource not reserved before, and the other of which is that the terminal may reserve the time-frequency resources reserved before and not reserved before at the same time.

For example, at least one of the first type time-frequency resources not reserved before is determined as the time-frequency resource needing to be reserved includes:

the quantity of the first type time-frequency resources needing to be reserved and not reserved before is min (Nmax−1, M−K), and the quantity of the first type time-frequency resources needing to be reserved and already reserved and not used is 0, where K is the total quantity of the first type time-frequency resources already reserved at present and not used; or the quantity of the first type time-frequency resources needing to be reserved and not reserved before is min (Nmax−1, M−K, L), and the quantity of the first type time-frequency resources needing to be reserved and already reserved and not used is min (K, Nmax−1−min (Nmax−1, M−K, L)), where L is the total quantity of the first type time-frequency resources not yet reserved at present.

Figure 5:
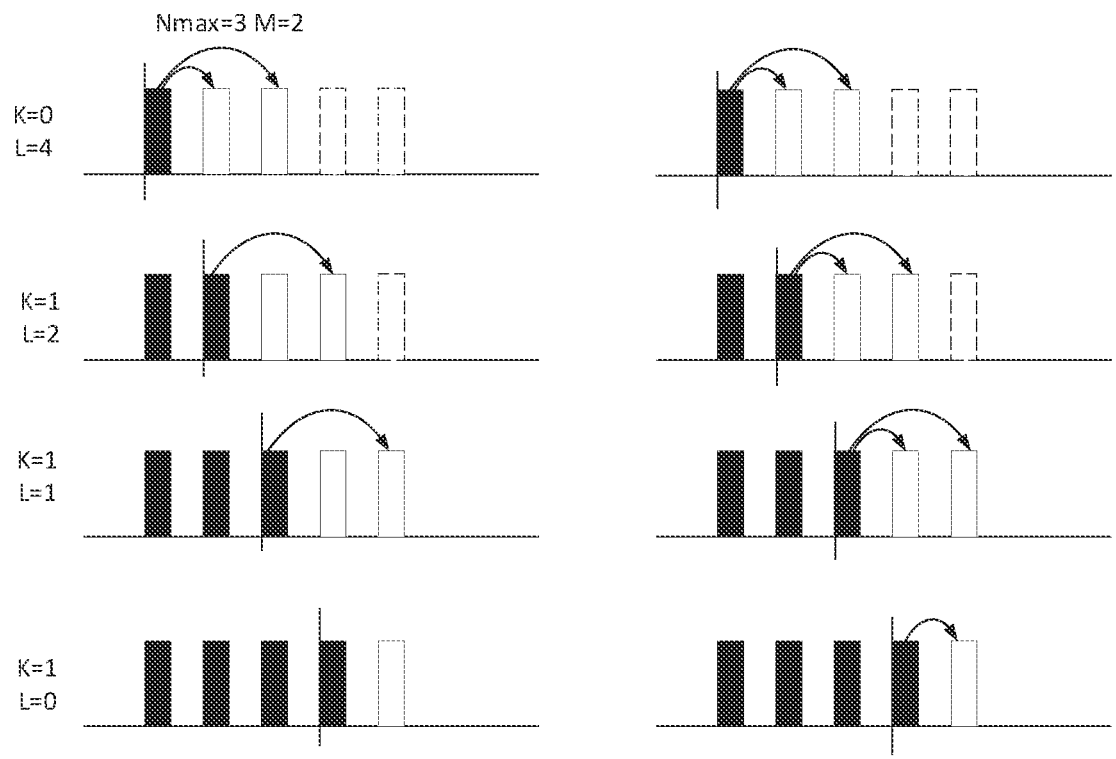
FIG. 5 is a schematic diagram of resource reservation illustrated according to an example.
Figure 6:
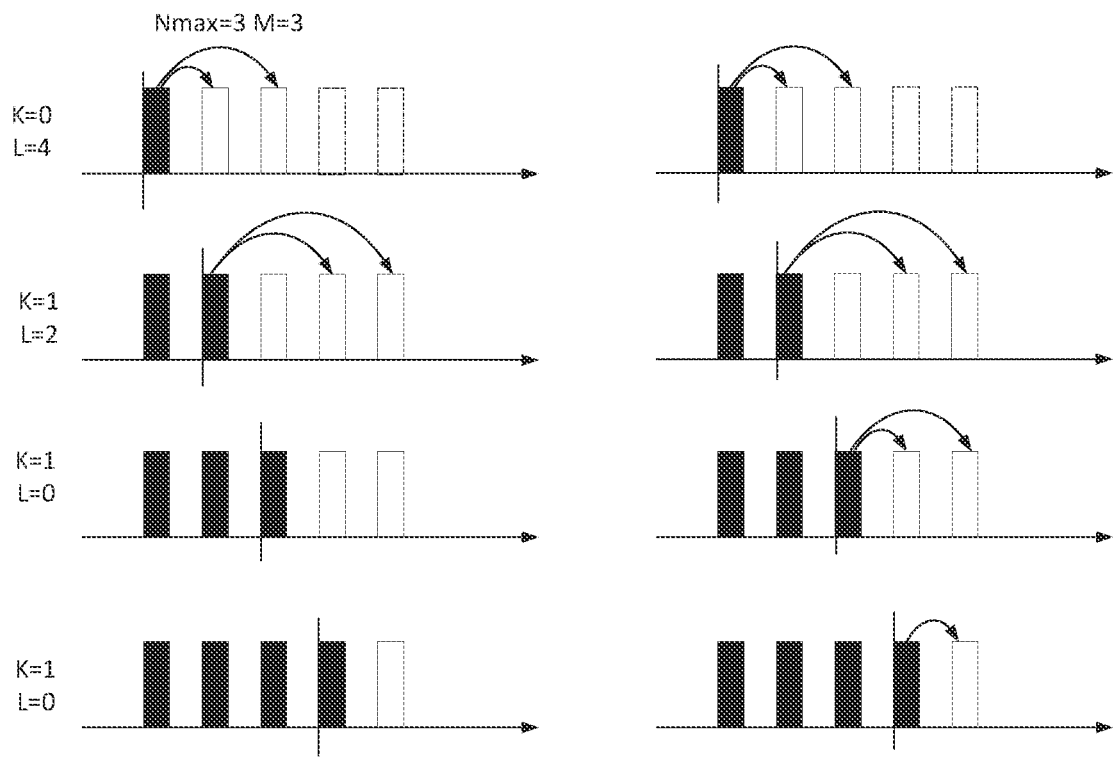
FIG. 6 is a schematic diagram of resource reservation illustrated according to an example.

Hypothetically, Nmax=3, M=2 or 3, the user device selects a total of five time-frequency resources. Hypothetically, sidelink data transmission is completed successfully (for example, ACK information fed back by a receiving end is received) after the user device performs transmission for a total of four times (namely, using four time-frequency resources), so a resource reservation condition performed with control information associated with transmission of every time is shown in the figure. FIG. 5 illustrates a schematic diagram of resource reservation when M=2, and FIG. 6 illustrates a schematic diagram of resource reservation when M=3. Referring to FIG. 5 and FIG. 6, black columns represent time-frequency resources already used and under use, white columns represent time-frequency resources already reserved and to be reserved this time, dotted-line columns represent time-frequency resources not reserved, and columns pointed by arrows represent time-frequency resources to be reserved this time. In FIG. 5 and FIG. 6, left sides illustrate a condition of reserving merely time-frequency resources not reserved before, and right sides illustrate a condition of reserving time-frequency resources reserved before and not reserved before at the same time.

For example, at least one of the first type time-frequency resources is determined as the time-frequency resource needing to be reserved includes:

the quantity of the first type time-frequency resources needing to be reserved and not used is min (Nmax−1, P), where P is the total quantity of the first type time-frequency resources already selected by a user but not yet used for transmission; and in this case, under the condition that Nmax=3 and M=2, the resource reservation condition is the same as the condition on the right side in FIG. 5.

Or the quantity of the first type time-frequency resources needing to be reserved and not used is min (Nmax−1, L), where L is the total quantity of the first type time-frequency resources not yet reserved at present; and in this case, under the condition that Nmax=3 and M=2, the resource reservation condition is the same as the condition on the left side in FIG. 5.

In step 204 and step 205, the terminal may perform, according to a chronological order, resource reservation on the first type time-frequency resources needing to be reserved after the current transmission.

In step 206, the terminal sends sidelink control information, in which the sidelink control information includes information of time-frequency resources needing to be reserved.

The terminal may notify other terminals of the reserved time-frequency resources through the sidelink control information, so that reservation of these time-frequency resources is realized.

Under the condition that a periodic resource reservation configuration value of the terminal is "disable" or control information associated in initial transmission of a data transmission block indicates that a period is 0, the terminal merely needs to select a time-frequency resource among time-frequency resources in the current transmission period for reservation without considering resource reservation in the subsequent transmission period, namely a solution shown in FIG. 4.

Figure 7:
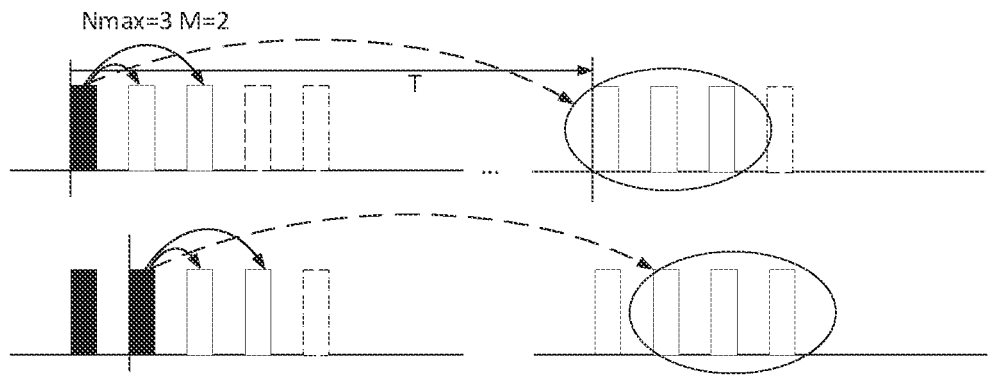
FIG. 7 is a schematic diagram of resource reservation illustrated according to an example.

However, under the condition that the periodic resource reservation configuration value is "enable" and control information associated in initial transmission of the data transmission block indicates that a period is not 0, in this case, a resource reservation period T is indicated in the initial transmission of the data transmission block. Referring to FIG. 7, the time frequency after T periods, which corresponds to the time frequency used and the time frequency reserved for each transmission, will be reserved at the same time as each transmission.

Figure 8:
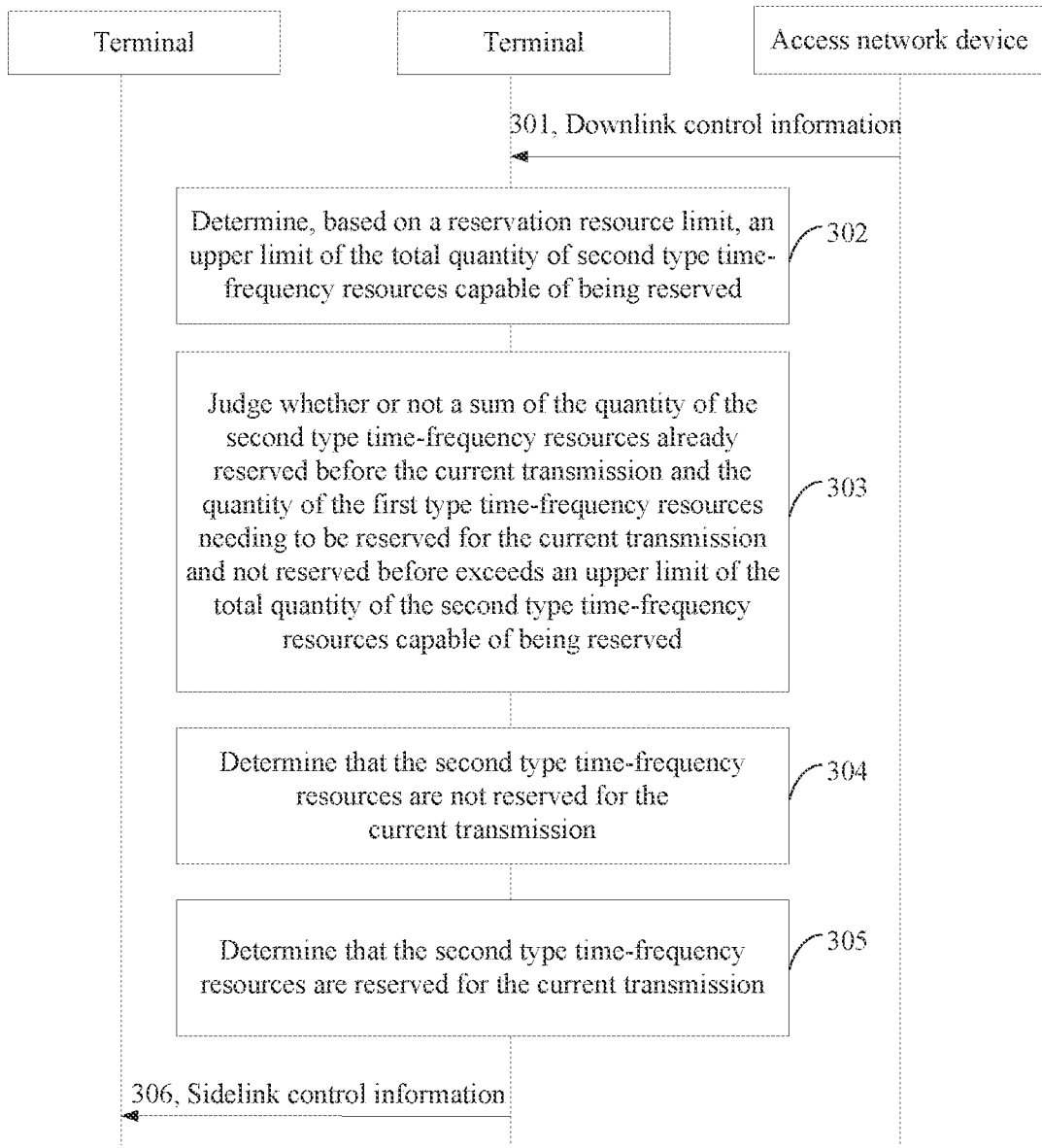
FIG. 8 is a flowchart of a resource reservation method illustrated according to an example.
Figure 10:
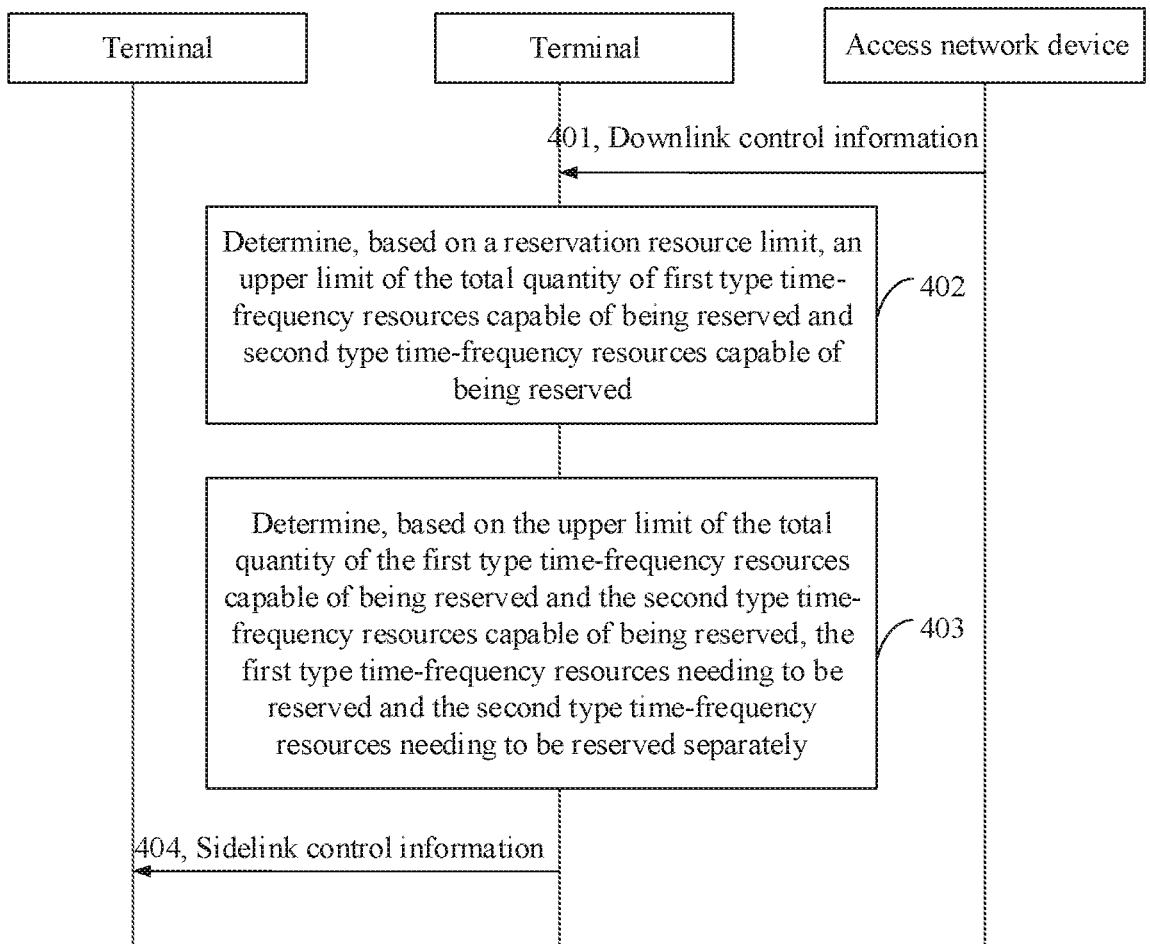
FIG. 10 is a schematic structural diagram of a resource reservation apparatus illustrated according to an example.

The terminal may also perform resource reservation according to solutions provided in FIG. 8 and FIG. 10 besides reserving the time-frequency resources according to a mode in FIG. 7.

FIG. 8 is a flowchart of a resource reservation method illustrated according to an example. Referring to FIG. 8, the method includes the following steps:

in step 301, an access network device sends downlink control information to a terminal, in which a reservation resource limit is carried in the downlink control information; and the terminal receives the downlink control information sent by the access network device.

Detailed description of the step may refer to step 201.

In step 302, the terminal determines, based on the reservation resource limit, an upper limit of the total quantity of the second type time-frequency resources capable of being reserved.

Here, in the reservation resource limit, a numerical value of the upper limit of the total quantity of the second type time-frequency resources capable of being reserved may be directly defined, or a method for obtaining the upper limit of the total quantity of the second type time-frequency resources capable of being reserved may also be defined.

For example, a statistical value of the number of times of transmissions in each period of the terminal within a set time length before a period the current transmission is within may be determined; and a rounded-off statistical value is used as the upper limit of the total quantity of the second type time-frequency resources capable of being reserved.

Here, set time may be a plurality of periods, a plurality of slots, or a fixed time length (for example, 1 second) and the like. The statistical value may be an average value, a median value or a value of a specific percentage in a cumulative distribution function.

The method provided by the example of the disclosure may be executed merely in certain scenarios, for example, the method may also include: whether or not a using condition of the reservation resource limit is met is determined, in which the using condition of the reservation resource limit includes at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and step 302 is executed in response to that the using condition of the reservation resource limit is met.

In step 303, the terminal judges whether or not a sum of the quantity of the second type time-frequency resources already reserved before the current transmission and the quantity of the first type time-frequency resources needing to be reserved for the current transmission and not reserved before exceeds the upper limit of the total quantity of the second type time-frequency resources capable of being reserved. Step 304 is executed in response to that the sum exceeds the upper limit of the total quantity of the second type time-frequency resources capable of being reserved; and step 305 is executed in response to that the sum does not exceed the upper limit of the total quantity of the second type time-frequency resources capable of being reserved.

The first type time-frequency resources are aperiodic time-frequency resources or periodic time-frequency resources in the same period of the current transmission, and the second type time-frequency resources are periodic time-frequency resources in a next period of the current transmission.

In step 304, the terminal determines that the second type time-frequency resources are not reserved for the current transmission.

In step 305, the terminal determines that the second type time-frequency resources are reserved for the current transmission.

Here, the second type time-frequency resources may be reserved by repeatedly using the mode of the resources of the first type.

Figure 9:
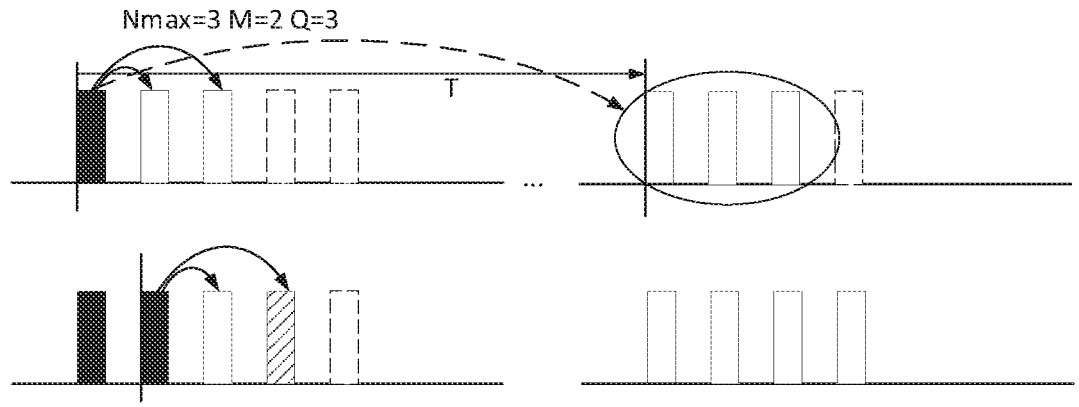
FIG. 9 is a schematic diagram of resource reservation illustrated according to an example.

Under the condition that the quantity of all performed and all reserved transmissions from the transmission of a first time to the current transmission does not exceed the upper limit Q of the total quantity of the second type time-frequency resources capable of being reserved, reservation of time-frequency resources in the next period is performed by using a resource reservation period T; and otherwise, the resource reservation period is set as 0. Referring to FIG. 9, during transmission of the first time, the quantity of the second type time-frequency resources already reserved before the current transmission is 0, the quantity of the first type time-frequency resources needing to be reserved for the current transmission and not reserved before is 2, at the moment, the sum is 2 and does not exceed 3, so reservation of the second type time-frequency resources is performed this time. During transmission of the second time, the quantity of the second type time-frequency resources already reserved before the current transmission is 3, the quantity of the first type time-frequency resources needing to be reserved for the current transmission and not reserved before (shadow columns in figure) is 1, at the moment, the sum is 4 and exceeds 3, so reservation of the second type time-frequency resources is not performed this time.

Here, T may be given by a system according to transmission features of the terminal.

In step 306, the terminal sends sidelink control information, in which the sidelink control information includes information of time-frequency resources needing to be reserved.

The terminal may notify other terminals of the reserved time-frequency resources through the sidelink control information, so that reservation of these time-frequency resources is realized.

FIG. 10 is a flowchart of a resource reservation method illustrated according to an example. Referring to FIG. 10, the method includes the following steps:

in step 401, an access network device sends downlink control information to a terminal, in which a reservation resource limit is carried in the downlink control information; and the terminal receives the downlink control information sent by the access network device.

Detailed description of the step may refer to step 201.

In step 402, the terminal determines, based on the reservation resource limit, an upper limit of the total quantity of the first type time-frequency resources capable of being reserved and the second type time-frequency resources capable of being reserved.

The method provided by the example of the disclosure may be executed merely in certain scenarios, for example, the method may also include: whether or not a using condition of the reservation resource limit is met is determined, in which the using condition of the reservation resource limit includes at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and step 402 is executed in response to that the using condition of the reservation resource limit is met.

In step 403, the terminal determines, based on the upper limit of the total quantity of the first type time-frequency resources capable of being reserved and the second type time-frequency resources capable of being reserved, the first type time-frequency resources needing to be reserved and the second type time-frequency resources needing to be reserved separately.

In this case, the terminal may select, for retransmission, the quantity of time-frequency resources reserved but not used and select the quantity of time-frequency resources reserved for new data transmission in a next period, and it is guaranteed that a sum of the both does not exceed the upper limit S of the total quantity of the first type time-frequency resources capable of being reserved and the second type time-frequency resources capable of being reserved.

Figure 11:
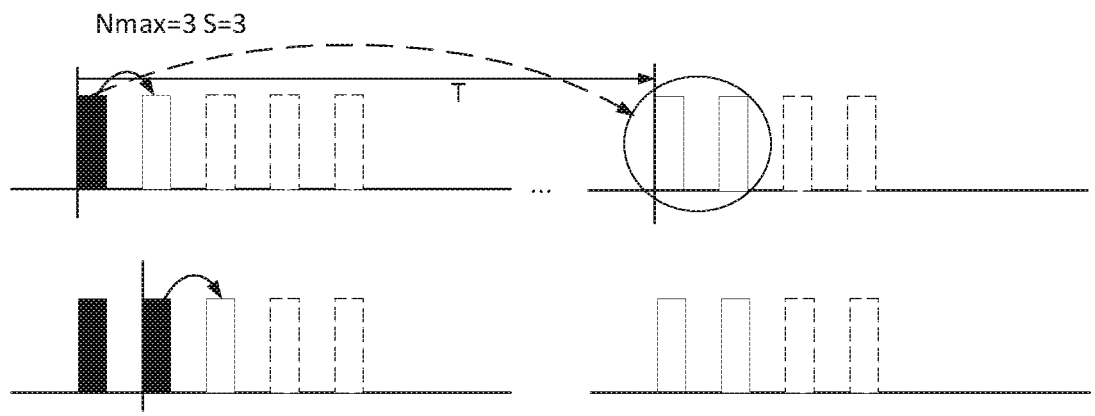
FIG. 11 is a schematic diagram of resource reservation illustrated according to an example.
Figure 12:
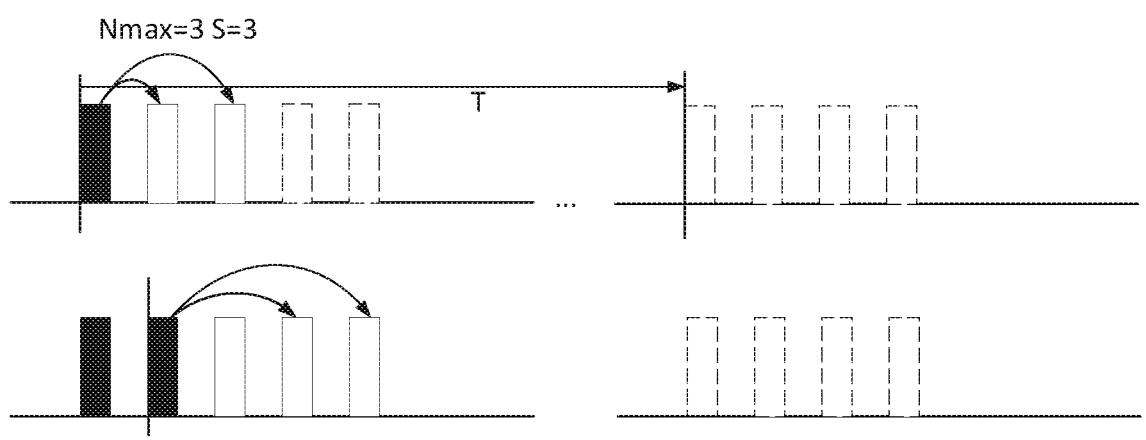
FIG. 12 is a schematic diagram of resource reservation illustrated according to an example.

A possible example is as follows: the terminal may reduce the quantity of reserved resources for repeated transmissions in the current period so as to guarantee that a certain quantity of resources are reserved in the next period. As shown in FIG. 11, during transmission of the second time, as two second type time-frequency resources are reserved for the transmission of the first time, at the moment, in response to that one first type time-frequency resource is to be reserved, reservation of the second type time-frequency resources is not performed any more. Or, the terminal may also select reservation of more resources for the repeated transmissions in the current period and sacrifice reserved resources in the next period, as shown in FIG. 12.

In step 404, the terminal sends sidelink control information, in which the sidelink control information includes information of time-frequency resources needing to be reserved.

The terminal may notify other terminals of the reserved time-frequency resources through the sidelink control information, so that reservation of these time-frequency resources is realized.

Figure 13:
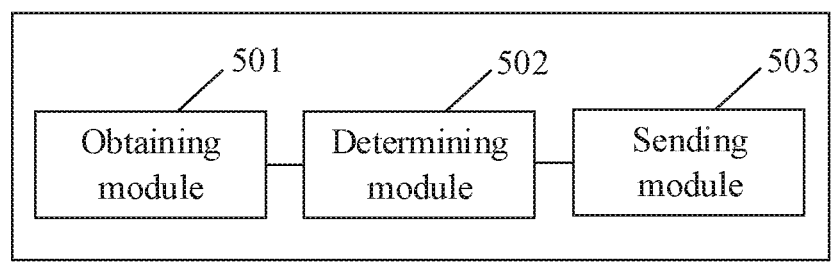
FIG. 13 is a schematic structural diagram of a resource reservation apparatus illustrated according to an example.

FIG. 13 is a schematic structural diagram of a resource reservation apparatus illustrated according to an example. The apparatus has functions of the terminal implementing the examples of the above method, and the functions may be implemented by hardware or implemented by executing corresponding software by the hardware. As shown in FIG. 13, the apparatus includes:

an obtaining module 501, configured to obtain a reservation resource limit, in which the reservation resource limit is configured to limit the quantity of time-frequency resources reserved by a terminal;

a determining module 502, configured to determine, based on the reservation resource limit, time-frequency resources needing to be reserved for current transmission; and a sending module 503, configured to send sidelink control information, in which the sidelink control information includes information of the time-frequency resources needing to be reserved.

In an implementation of the example of the disclosure, the determining module 502 is configured to determine whether or not a using condition of the reservation resource limit is met, in which the using condition of the reservation resource limit includes at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and determine, based on the reservation resource limit, the time-frequency resources needing to be reserved for the current transmission in response to that the using condition of the reservation resource limit is met.

In an implementation of the example of the disclosure, the determining module 502 is configured to determine, based on the reservation resource limit, first type time-frequency resources needing to be reserved for the current transmission; or determine, based on the reservation resource limit, first type time-frequency resources needing to be reserved and second type time-frequency resources needing to be reserved for the current transmission. The first type time-frequency resources are aperiodic time-frequency resources or periodic time-frequency resources in the same period of the current transmission, and the second type time-frequency resources are periodic time-frequency resources in a next period of the current transmission.

In an implementation of the example of the disclosure, the determining module 502 is configured to determine whether or not the first type time-frequency resources already reserved before the current transmission and not used reach an upper limit of the total quantity of the first type time-frequency resources capable of being reserved; determine at least one of the first type time-frequency resources already reserved and not used as the time-frequency resource needing to be reserved, or determine the first type time-frequency resources needing to be reserved as null in response to that the first type time-frequency resources already reserved and not used reach the upper limit of the total quantity of the first type time-frequency resources capable of being reserved; and determine at least one of the first type time-frequency resources or at least one of the first type time-frequency resources not reserved before as the time-frequency resource needing to be reserved in response to that the first type time-frequency resources already reserved and not used do not reach the upper limit of the total quantity of the first type time-frequency resources capable of being reserved.

In an implementation of the example of the disclosure, the determining module 502 is configured to determine, based on a pre-defined or pre-configured reservation resource limit, the upper limit of the total quantity of the first type time-frequency resources capable of being reserved; or determine, based on a reservation resource limit carried in downlink control information sent by an access network device, the upper limit of the total quantity of the first type time-frequency resources capable of being reserved.

In an implementation of the example of the disclosure, the determining module 502 is configured to use the following parameter values as the quantity of the time-frequency resources needing to be reserved: min (Nmax−1, M), where Nmax is the total quantity including the time-frequency resource used this time and the first type time-frequency resources capable of being reserved in sidelink control information, and M is the upper limit of the total quantity of the first type time-frequency resources not used and capable of being reserved.

The determining module 502 is configured to determine the quantity of the first type time-frequency resources not reserved before and the quantity of the first type time-frequency resources already reserved and not used according to the following modes.

The quantity of the first type time-frequency resources needing to be reserved and not reserved before is min (Nmax−1, M−K), and the quantity of the first type time-frequency resources needing to be reserved and already reserved and not used is 0, where K is the total quantity of the first type time-frequency resources already reserved at present and not used; or the quantity of the first type time-frequency resources needing to be reserved and not reserved before is min (Nmax−1, M−K, L), and the quantity of the first type time-frequency resources needing to be reserved and already reserved and not used is min (K, Nmax−1−min (Nmax−1, M−K, L)), where L is the total quantity of the first type time-frequency resources not yet reserved at present.

The determining module 502 is configured to determine the quantity of the first type time-frequency resources according to the following modes.

The quantity of the first type time-frequency resources needing to be reserved and not used is min (Nmax−1, P), where P is the total quantity of the first type time-frequency resources already selected by a user but not yet used for transmission; or the quantity of the first type time-frequency resources needing to be reserved and not used is min (Nmax−1, L).

In an implementation of the example of the disclosure, the determining module 502 is further configured to perform, according to a chronological order, resource reservation on the first type time-frequency resources needing to be reserved after the current transmission.

In an implementation of the example of the disclosure, the determining module 502 is configured to determine the quantity of the first type time-frequency resources needing to be reserved for the current transmission and not reserved before; determine whether or not a sum of the quantity of the second type time-frequency resources already reserved before the current transmission and the quantity of the first type time-frequency resources needing to be reserved for the current transmission and not reserved before exceeds the upper limit of the total quantity of the second type time-frequency resources capable of being reserved; determine that the second type time-frequency resources are not reserved for the current transmission in response to that the sum exceeds the upper limit of the total quantity of the second type time-frequency resources capable of being reserved; and determine that the second type time-frequency resources are reserved for the current transmission in response to that the sum does not exceed the upper limit of the total quantity of the second type time-frequency resources capable of being reserved.

In an implementation of the example of the disclosure, the determining module 502 is configured to determine, based on a pre-defined or pre-configured reservation resource limit, an upper limit of the total quantity of the second type time-frequency resources capable of being reserved; or determine, based on a reservation resource limit carried in downlink control information sent by an access network device, an upper limit of the total quantity of the second type time-frequency resources capable of being reserved.

In an implementation of the example of the disclosure, the determining module 502 is configured to determine a statistical value of the number of times of transmissions in each period of the terminal within a set time length before a period the current transmission is within; and use a rounded-off statistical value as the upper limit of the total quantity of the second type time-frequency resources capable of being reserved.

In an implementation of the example of the disclosure, the determining module 502 is configured to determine, based on an upper limit of the total quantity of the first type time-frequency resources capable of being reserved and the second type time-frequency resources capable of being reserved, the first type time-frequency resources needing to be reserved and the second type time-frequency resources needing to be reserved separately.

In an implementation of the example of the disclosure, the determining module 502 is configured to determine, based on a pre-defined or pre-configured reservation resource limit, the upper limit of the total quantity of the first type time-frequency resources capable of being reserved and the second type time-frequency resources capable of being reserved; or determine, based on a reservation resource limit carried in downlink control information sent by an access network device, the upper limit of the total quantity of the first type time-frequency resources capable of being reserved and the second type time-frequency resources capable of being reserved.

Figure 14:
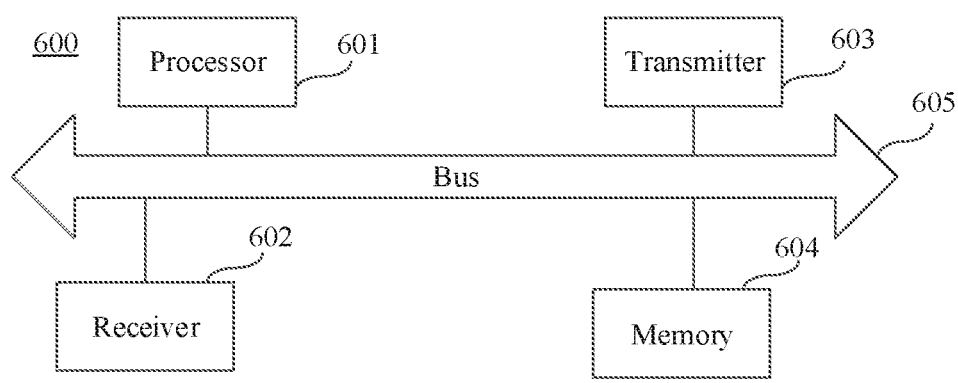
FIG. 14 is a block diagram of a terminal illustrated according to an example.

FIG. 14 is a block diagram of a terminal 600 illustrated according to an example. The terminal 600 may include: a processor 601, a receiver 602, a transmitter 603, a memory 604 and a bus 605.

The processor 601 includes one or more than one processing cores. The processor 601 runs a software program and modules so as to execute various function applications and information processing.

The receiver 602 and the transmitter 603 may be implemented as a communication component. The communication component may be a communication chip.

The memory 604 is connected to the processor 601 through the bus 605.

The memory 604 may be configured to store at least one instruction. The processor 601 is configured to execute the at least one instruction so as to implement all steps in the examples of the above method.

Besides, the memory 604 may be implemented by any type of volatile or non-volatile storage device or their combination. The volatile or non-volatile storage device includes but is not limited to: a magnetic disc or a compact disc, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In an example, a computer-readable storage medium is further provided. The computer-readable storage medium stores at least one instruction, at least one section of program, a code set or an instruction set, and the at least one instruction, the at least one section of program, the code set or the instruction set is loaded and executed by a processor so as to implement the resource reservation method provided by each example of the above method.

An example of the disclosure further provides a resource reservation system. The resource reservation system includes a terminal. The terminal is a terminal provided by the example shown in FIG. 14.

Those skilled in the art will easily figure out other implementation solutions of the disclosure after considering the specification and practicing the disclosure disclosed herein. The application intends to cover any transformation, purpose or adaptive change of the disclosure which conform to a general principle of the disclosure and include common general knowledge or conventional technical means in the technical field not disclosed by the disclosure. The specification and examples are regarded as merely instances, and the true scope and spirit of the disclosure is indicated by the following claims.

It should be understood that the disclosure is not limited by an accurate structure already described above and shown in the accompanying drawings, and various modifications and changes can be made without departing from its scope. The scope of the disclosure is limited merely by appended claims.

The invention claimed is:

1. A resource reservation method, comprising:
   obtaining a reservation resource limit, wherein the reservation resource limit is configured to limit a quantity of time-frequency resources reserved by a terminal;
   determining, based on the reservation resource limit, time-frequency resources needing to be reserved for current transmission; and sending sidelink control information, wherein the sidelink control information comprises information of the time-frequency resources needing to be reserved;

wherein determining, based on the reservation resource limit, the time-frequency resources needing to be reserved for the current transmission comprises:

determining whether or not a using condition of the reservation resource limit is met, wherein the using condition of the reservation resource limit comprises at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and determining, based on the reservation resource limit, the time-frequency resources needing to be reserved for the current transmission in response to that the using condition of the reservation resource limit is met.

2. The resource reservation method according to claim 1, wherein the reservation resource limit comprises at least one of an upper limit of a total quantity of first type time-frequency resources capable of being reserved, an upper limit of a total quantity of second type time-frequency resources capable of being reserved, or an upper limit of a total quantity of the first type time-frequency resources capable of being reserved and the second type time-frequency resources capable of being reserved; and reservation resource limits corresponding to different data priorities are different.

3. The resource reservation method according to claim 1, wherein determining, based on the reservation resource limit, the time-frequency resources needing to be reserved for the current transmission comprises:

determining, based on the reservation resource limit, first type time-frequency resources needing to be reserved for the current transmission; or determining, based on the reservation resource limit, the first type time-frequency resources needing to be reserved for the current transmission and second type time-frequency resources needing to be reserved for the current transmission; wherein the first type time-frequency resources needing to be reserved for the current transmission are aperiodic time-frequency resources or periodic time-frequency resources in a same period of the current transmission, and the second type time-frequency resources needing to be reserved for the current transmission are periodic time-frequency resources in a next period of the current transmission.

4. The resource reservation method according to claim 3, wherein determining, based on the reservation resource limit, the first type time-frequency resources needing to be reserved for the current transmission comprises:

determining whether or not first type time-frequency resources already reserved before the current transmission and not used reach an upper limit of a total quantity of first type time-frequency resources capable of being reserved;

determining at least one of the first type time-frequency resources already reserved before the current transmission and not used as the time-frequency resources needing to be reserved for the current transmission, or determining the first type time-frequency resources needing to be reserved for the current transmission as null in response to that the first type time-frequency resources already reserved before the current transmission and not used reach the upper limit of the total quantity of the first type time-frequency resources capable of being reserved; and determining at least one of first type time-frequency resources or at least one of first type time-frequency resources not reserved before as the time-frequency resources needing to be reserved for the current transmission in response to that the first type time-frequency resources already reserved before the current transmission and not used do not reach the upper limit of the total quantity of the first type time-frequency resources capable of being reserved.

5. The resource reservation method according to claim 4, wherein determining whether or not the first type time-frequency resources already reserved before the current transmission and not used reach the upper limit of the total quantity of the first type time-frequency resources capable of being reserved comprises:

determining, based on a pre-defined or pre-configured reservation resource limit, the upper limit of the total quantity of the first type time-frequency resources capable of being reserved; or determining, based on a reservation resource limit carried in downlink control information sent by an access network device, the upper limit of the total quantity of the first type time-frequency resources capable of being reserved.

6. The resource reservation method according to claim 4, wherein determining at least one of the first type time-frequency resources already reserved before the current transmission and not used as the time-frequency resources needing to be reserved for the current transmission comprises:

using the following parameter values as a quantity of the time-frequency resources needing to be reserved for the current transmission:

min ($N_{max}-1$, M), wherein $N_{max}$ is a total quantity comprising time-frequency resources used this time and first type time-frequency resources capable of being reserved in sidelink control information, and M is an upper limit of a total quantity of first type time-frequency resources not used and capable of being reserved.

7. The resource reservation method according to claim 4, wherein determining, based on the reservation resource limit, the first type time-frequency resources needing to be reserved for the current transmission further comprises:

performing, according to a chronological order, resource reservation on first type time-frequency resources needing to be reserved after the current transmission.

8. The resource reservation method according to claim 3, wherein determining, based on the reservation resource limit, the first type time-frequency resources needing to be reserved for the current transmission and the second type time-frequency resources needing to be reserved for the current transmission comprises:

determining a quantity of first type time-frequency resources needing to be reserved for the current transmission and not reserved before;

determining whether or not a sum of a quantity of second type time-frequency resources already reserved before the current transmission and the quantity of the first type time-frequency resources needing to be reserved for the current transmission and not reserved before exceeds an upper limit of a total quantity of second type time-frequency resources capable of being reserved;

determining that the second type time-frequency resources needing to be reserved for the current transmission are not reserved for the current transmission in response to that the sum exceeds the upper limit of the total quantity of the second type time-frequency resources capable of being reserved; and determining that the second type time-frequency resources needing to be reserved for the current transmission are reserved for the current transmission in response to that the sum does not exceed the upper limit of the total quantity of the second type time-frequency resources capable of being reserved.

9. The resource reservation method according to claim 8, wherein determining whether or not the sum of the quantity of the second type time-frequency resources already reserved before the current transmission and the quantity of the first type time-frequency resources needing to be reserved for the current transmission and not reserved before exceeds the upper limit of the total quantity of the second type time-frequency resources capable of being reserved comprises:

determining, based on a pre-defined or pre-configured reservation resource limit, the upper limit of the total quantity of the second type time-frequency resources capable of being reserved; or determining, based on a reservation resource limit carried in downlink control information sent by an access network device, the upper limit of the total quantity of the second type time-frequency resources capable of being reserved.

10. The resource reservation method according to claim 8, wherein determining whether or not the sum of the quantity of the second type time-frequency resources already reserved before the current transmission and the quantity of the first type time-frequency resources needing to be reserved for the current transmission and not reserved before exceeds the upper limit of the total quantity of the second type time-frequency resources capable of being reserved comprises:

determining a statistical value of a number of times of transmissions in each period of the terminal within a set time length before a period the current transmission is within; and using a rounded-off statistical value as the upper limit of the total quantity of the second type time-frequency resources capable of being reserved.

11. The resource reservation method according to claim 3, wherein determining, based on the reservation resource limit, the first type time-frequency resources needing to be reserved for the current transmission and the second type time-frequency resources needing to be reserved for the current transmission comprises:

determining, based on an upper limit of a total quantity of first type time-frequency resources capable of being reserved and second type time-frequency resources capable of being reserved, the first type time-frequency resources needing to be reserved for the current transmission and the second type time-frequency resources needing to be reserved for the current transmission separately.

12. The resource reservation method according to claim 11, wherein determining, based on the upper limit of the total quantity of the first type time-frequency resources capable of being reserved and the second type time-frequency resources capable of being reserved, the first type time-frequency resources needing to be reserved for the current transmission and the second type time-frequency resources needing to be reserved for the current transmission separately comprises:

determining, based on a pre-defined or pre-configured reservation resource limit, the upper limit of the total quantity of the first type time-frequency resources capable of being reserved and the second type time-frequency resources capable of being reserved; or determining, based on a reservation resource limit carried in downlink control information sent by an access network device, the upper limit of the total quantity of the first type time-frequency resources capable of being reserved and the second type time-frequency resources capable of being reserved.

13. A terminal, comprising:
a processor; and
a memory configured to store an instruction executable by the processor, wherein
the processor is configured to:
obtain a reservation resource limit, wherein the reservation resource limit is configured to limit a quantity of time-frequency resources reserved by a terminal;
determine, based on the reservation resource limit, time-frequency resources needing to be reserved for current transmission; and
send sidelink control information, wherein the sidelink control information comprises information of the time-frequency resources needing to be reserved;
wherein the processor is configured to determine, based on the reservation resource limit, the time-frequency resources needing to be reserved for the current transmission by:
determining whether or not a using condition of the reservation resource limit is met, wherein the using condition of the reservation resource limit comprises at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and
determining, based on the reservation resource limit, the time-frequency resources needing to be reserved for the current transmission in response to that the using condition of the reservation resource limit is met.

14. A non-transitory computer-readable storage medium, wherein when an instruction in the computer-readable storage medium is executed by a processor, the following operations are implemented:

obtaining a reservation resource limit, wherein the reservation resource limit is configured to limit a quantity of time-frequency resources reserved by a terminal;

determining, based on the reservation resource limit, time-frequency resources needing to be reserved for current transmission; and sending sidelink control information, wherein the sidelink control information comprises information of the time-frequency resources needing to be reserved;

wherein determining, based on the reservation resource limit, the time-frequency resources needing to be reserved for the current transmission comprises:
determining whether or not a using condition of the reservation resource limit is met, wherein the using condition of the reservation resource limit comprises at least one of the following: a time-frequency resource used for transmission belongs to a set bandwidth, the time-frequency resource used for transmission belongs to a set sidelink transmission resource pool, the terminal is located in a set region, the terminal is a set terminal, or a priority of to-be-transmitted data belongs to a set priority; and determining, based on the reservation resource limit, the time-frequency resources needing to be reserved for the current transmission in response to that the using condition of the reservation resource limit is met.

15. The resource reservation method according to claim 6, wherein determining at least one of the first type time-frequency resources not reserved before as the time-frequency resources needing to be reserved for the current transmission comprises:

a quantity of first type time-frequency resources needing to be reserved and not reserved before is min (Nmax−1, M−K), and a quantity of first type time-frequency resources needing to be reserved and already reserved and not used is 0, wherein K is a total quantity of first type time-frequency resources already reserved at present and not used.

16. The resource reservation method according to claim 15, wherein determining at least one of the first type time-frequency resources not reserved before as the time-frequency resources needing to be reserved for the current transmission further comprises:

the quantity of the first type time-frequency resources needing to be reserved and not reserved before is min (Nmax−1, M−K, L), and the quantity of the first type time-frequency resources needing to be reserved and already reserved and not used is min (K, Nmax−1−min (Nmax−1, M−K, L)), wherein L is a total quantity of first type time-frequency resources not yet reserved at present.

17. The resource reservation method according to claim 6, wherein determining at least one of the first type time-frequency resources as the time-frequency resources needing to be reserved for the current transmission comprises:

a quantity of first type time-frequency resources needing to be reserved and not used is min (Nmax−1, P), wherein P is a total quantity of first type time-frequency resources already selected by a user but not yet used for transmission.

18. The resource reservation method according to claim 16, wherein determining at least one of the first type time-frequency resources as the time-frequency resources needing to be reserved for the current transmission comprises:

a quantity of first type time-frequency resources needing to be reserved and not used is min (Nmax−1, L).

* * * * *